(12) United States Patent
Holzschuh

(10) Patent No.: US 8,834,111 B2
(45) Date of Patent: Sep. 16, 2014

(54) CHARGING DEVICE

(75) Inventor: Christian Holzschuh, Fellbach (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 694 days.

(21) Appl. No.: 13/086,482

(22) Filed: Apr. 14, 2011

(65) Prior Publication Data

US 2011/0255955 A1 Oct. 20, 2011

(30) Foreign Application Priority Data

Apr. 15, 2010 (DE) .......... 10 2010 015 272

(51) Int. Cl.
*F01D 25/24* (2006.01)
*F01D 11/00* (2006.01)
*F02C 6/12* (2006.01)

(52) U.S. Cl.
CPC .............. *F01D 25/24* (2013.01); *F01D 11/003* (2013.01); *F05D 2230/90* (2013.01); *F05D 2240/55* (2013.01); *F05D 2220/40* (2013.01); *F02C 6/12* (2013.01)
USPC ....................... 415/203; 415/214.1

(58) Field of Classification Search
USPC ............... 415/214.1, 215.1, 203, 204, 205
See application file for complete search history.

(56) References Cited

U.S. PATENT DOCUMENTS

| | | | |
|---|---|---|---|
| 2,918,207 A | 12/1959 | Moore | |
| 3,106,381 A | 10/1963 | Leins | |
| 4,383,799 A | 5/1983 | Okano et al. | |
| 7,134,836 B2 | 11/2006 | Scherrer | |
| 7,600,969 B2 * | 10/2009 | Frankenstein et al. | ........ 415/177 |
| 2003/0107188 A1 | 6/2003 | Spence et al. | |
| 2006/0037317 A1 | 2/2006 | Leavesley | |
| 2007/0256412 A1 | 11/2007 | Martin et al. | |
| 2009/0151348 A1 | 6/2009 | Hayashi et al. | |
| 2009/0317247 A1 | 12/2009 | Hoecker et al. | |
| 2011/0038742 A1 | 2/2011 | Fleig et al. | |

FOREIGN PATENT DOCUMENTS

| | | |
|---|---|---|
| DE | 232524 C | 1/1986 |
| DE | 102004039473 A1 | 3/2006 |
| DE | 102009004737 A1 | 7/2009 |
| DE | 102008029080 A1 | 12/2009 |
| EP | 1988261 A1 | 11/2008 |
| EP | 2055911 A1 | 5/2009 |
| WO | WO-2007/107289 A1 | 9/2007 |

OTHER PUBLICATIONS

English abstract for EP-1988261.
English abstract for DE-102004039473.
German Search Report for DE102010015272.2.
EP Search Report for EP-11158203.7.

* cited by examiner

*Primary Examiner* — Dwayne J White
(74) *Attorney, Agent, or Firm* — Rader, Fishman & Grauer PLLC

(57) ABSTRACT

A charging device may include a turbine housing and a bearing housing. The bearing housing may have a bearing arrangement for a shaft carrying a turbine wheel and a compressor wheel. A gasket may be arranged by metal-to-metal connection between a radially orientated flat surface of the turbine housing and a radially orientated flat surface of the bearing housing. The gasket may be resilient.

20 Claims, 2 Drawing Sheets

CHARGING DEVICE

CROSS-REFERENCES TO RELATED APPLICATION

This application claims priority to German patent applications DE 10 2010 015272.2 filed on Apr. 15, 2010, which is hereby incorporated by reference in its entirety.

TECHNICAL FIELD

The present invention relates to a charging device, more preferably a turbocharger, with a bearing housing and a turbine housing according to the preamble of Claim 1.

BACKGROUND

From U.S. Pat. No. 7,134,836 B2 a turbocharger according to the prior art is known. The turbocharger comprises a bearing housing for mounting a shaft, a turbine housing and a compressor housing. In order to prevent a leakage of the hot exhaust gases a gasket is provided between the turbine housing and the bearing housing.

From EP 2 055 911 A1 a turbocharger is likewise described, wherein a gasket is arranged between a turbine housing and a bearing housing.

Because of its design, a gasket according to the prior art would already be deformed plastically upon assembly and because of this prior damage possesses an insufficient resilience. As a consequence, blowby occurs between the bearing housing and the turbine housing, which impairs the thermodynamic function of the exhaust gas turbocharger and has a negative effect on the emission and operational safety of the charger.

SUMMARY

The present invention therefore deals with the problem of stating an improved or at least an alternative embodiment for a turbocharger of the generic type, which more preferably does not have the disadvantages mentioned in the prior art.

According to the invention, this problem is solved through the subject of the independent claim. Advantageous embodiments are the subject of the dependent claims.

The present invention is based on the general idea of installing a gasket through a metal-to-metal connection between a turbine housing and a bearing housing and to configure said gasket resiliently. Particularly advantageously the resilient gasket is configured as disc spring. The disc spring preferentially consists of a heat-resistant steel material. The high flexibility of a gasket designed as disc spring guarantees an operationally safe sealing of the gap between the bearing housing and the turbine housing. To increase the micro-sealing effect, the gasket can be provided with a heat-resistant coating on its contact surfaces.

In an advantageous embodiment of the invention at least two disc springs are installed one after the other (radially spaced) by the metal-to-metal connection.

Further important features and advantages of the invention are obtained from the subclaims, from the drawings and from the corresponding figure description by means of the drawings.

It is to be understood that the features mentioned above and still to be explained in the following cannot only be used in the respective combination stated, but also in other combinations or by themselves, without leaving the scope of the present invention.

Preferred exemplary embodiments of the invention are shown in the drawings and are explained in more detail in the following description, wherein same reference characters refer to same or similar or functionally same components.

BRIEF DESCRIPTION OF THE DRAWING

It shows, in each case schematically.

DETAILED DESCRIPTION

Figure 1:
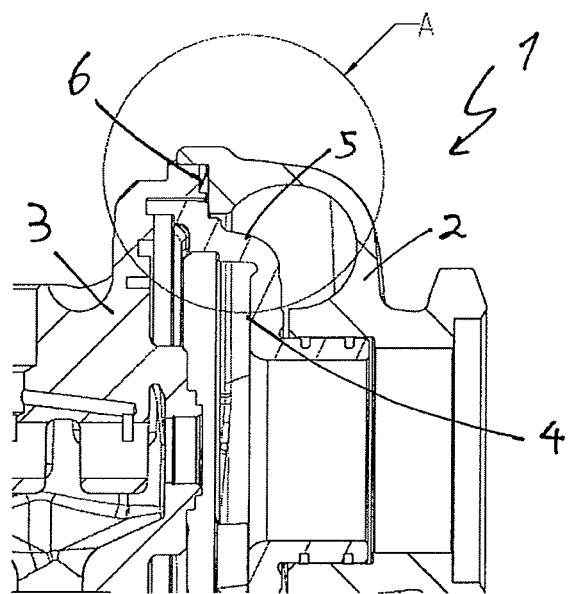
FIG. 1 a charging device with a gasket according to the invention.

According to FIG. 1, a charging device 1, more preferably an exhaust gas turbocharger, comprises at least one turbine housing 2 and a bearing housing 3. The bearing housing 3 serves for mounting a shaft (not shown). The turbine housing 2 conducts exhaust gases to a nozzle 4 upstream of a turbine wheel (not shown). Between the turbine housing 2 and the bearing housing 3 a guide vane cage 5 is arranged, preferentially clamped in. The guide vane cage 5 forms a radially extending side wall of the nozzle 4.

Figure 2:
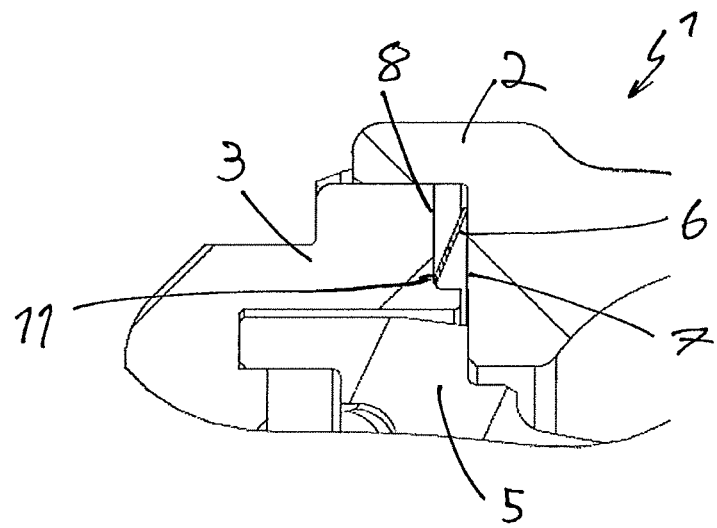
FIG. 2 an enlarged representation of the gasket in FIG. 1.

As is explained in FIG. 2, the guide vane cage 5 through this installation is in a floating contact connection. According to the invention, a resilient gasket 6 is now located in the gap between the bearing housing 3 and the turbine housing 2 resulting upon the assembly of the components and is thus installed by the metal-to-metal connection. The resilient gasket 6 is preferentially a disc spring. A disc spring offers a seal which compared with a V-gasket or a C-gasket upon high requirements has an improved spring behaviour and can be easily produced. FIG. 2 shows the disc spring in the clamped state. As shown in FIG. 2, the disc spring on the one hand abuts the radially orientated flat surface 7 of the turbine housing 2 and on the other hand the radially orientated flat surface 8 of the bearing housing 3. By being in contact with the two parallel flat surfaces 7, 8 of the components bearing housing 3 and turbine housing 2 the disc spring seals off the assembly. The high flexibility of the disc spring guarantees an operationally safe sealing of the radially orientated gap between the bearing housing 3 and the turbine housing 2. The disc spring is preferentially designed substantially in the shape of a truncated cone.

In FIG. 2 the disc spring freely lies in a radial recess 11 in the flange of the bearing housing 3. This version mainly has advantages in the assembly, since the gasket 6 is radially guided on the inner diameter and cannot be radially displaced upon the assembly and no jamming of the turbine housing 2 during the assembly can occur.

The depth of the radial recess 11 is decisive for the preload of the disc spring. The preload of the disc spring is to be adjusted individually to the individual application.

Figure 4:
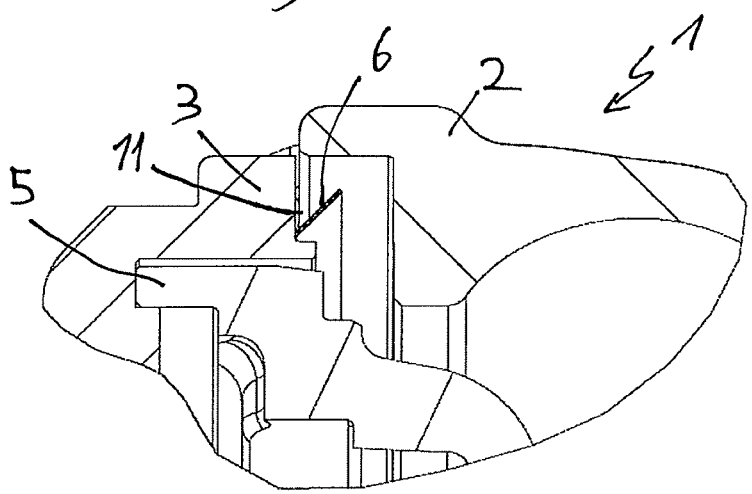
FIG. 4 a charging device with a gasket according to the invention prior to the assembly.

FIG. 4 exemplarily shows a further version of the gasket arrangement prior to the assembly of the bearing housing 3 to the turbine housing 2. The disc spring is supported by the bearing housing 3, the turbine housing 2 is pushed over the flange of the bearing housing until it contacts the guide vane cage 5. Because of this, the disc spring is preloaded and seals off the assembly by being in contact with both flat surfaces 7, 8 of the components bearing housing 3 and turbine housing 2. The turbine housing 2 is pushed into the bearing housing 3 so far until the guide vane cage 5 completely contacts both components bearing housing 3 and turbine housing 2.

The imaginary disc spring because of its design has a sufficiently high resilience in order to adequately seal off a gap that changes in operation.

In FIG. 4, the disc spring freely lies in a radial recess 11 in the flange of the bearing housing 3 before the assembly to the turbine housing 2. Here, the disc spring lies on the flat surface 8 of the bearing housing 3 on the inner diameter of the disc spring. Alternatively, the disc spring can also be supported in a slot on the bearing housing 3. It would also be conceivable that the end surface of the flange facing the turbine housing 2 is designed flat, i.e. without recess 11 or slot for the disc spring.

FIG. 4 shows a form of the disc spring inclined towards the outside. Alternatively, the disc spring can also have a form inclined towards the inside. The gasket 6, that is the disc spring, can consist of a heat-resistant steel material. Because of the prevailing temperatures, a nickel-based alloy is to be preferred as an alternative. In addition, the gasket 6 can be provided with a heat-resistant coating to increase the micro-sealing effect of its contact surfaces 9, 10.

When designing the disc spring it must be ensured that it is embodied suitably stiff in order to avoid the development of a possible floating contact connection at certain operating points. As a consequence, the cage 5 in operation would lose its preload and negatively influence the function of a variable turbine geometry.

Figure 3:
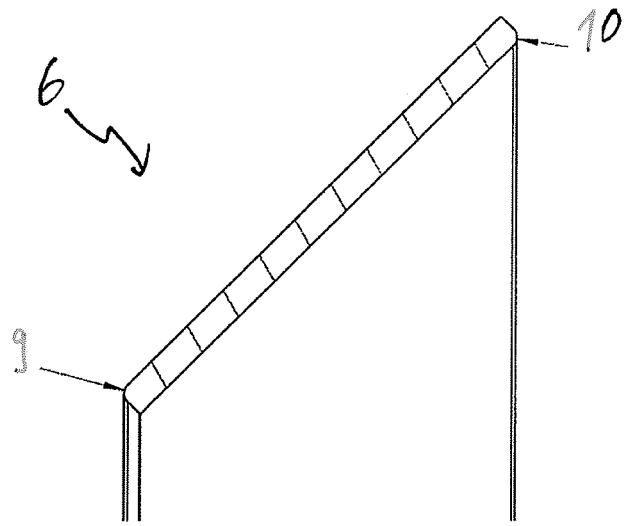
FIG. 3 a gasket according to the invention configured as disc spring.

FIG. 3 shows a disc spring according to a particularly advantageous embodiment of the invention. In order to reduce or exclude a possible digging-in of the disc spring 6 on the two flat surfaces 7, 8 on the bearing housing 3 and on the turbine housing 2 under the loads in operation (mechanical and thermal load), a burr that develops upon stamping/precision cutting on the edges that are in contact with the flat surfaces 7, 8 has to be removed in an advantageous version. Particularly preferred is a rounding-off of the contact surfaces 9, 10 of the disc spring with the bearing housing 3 and the turbine housing 2, since because of this the disc spring can roll off the flat surfaces 7, 8 in operation. Because of this, the sealing effect of the disc spring is maintained in operation over the running time of the charging device 1.

The invention claimed is:

1. A charging device comprising:
   a turbine housing,
   a bearing housing having a bearing arrangement for a shaft carrying a turbine wheel and a compressor wheel, a gasket arranged by metal-to-metal connection between a radially orientated flat surface of the turbine housing and a radially orientated flat surface of the bearing housing, wherein the gasket is resilient; and
   a guide vane cage disposed between the turbine housing and the bearing housing by a floating contact connection, wherein the guide vane cage forms a radially extending side wall of a nozzle.

2. The charging device according to claim 1, wherein the gasket is a disc spring.

3. The charging device according to claim 1, wherein the gasket is at least one of a heat-resistant steel material and a nickel-based alloy.

4. The charging device according to claim 2, wherein the disc spring is disposed at a contact point with the turbine housing and the bearing housing comprises rounded contact surfaces.

5. The charging device according to claim 1, wherein the gasket is disposed in a radial recess in a flange of the bearing housing.

6. The charging device according to claim 4, wherein the gasket includes a contact surface having a heat-resistant coating.

7. The charging device according to claim 1, wherein the gasket is formed by at least two disc springs.

8. The charging device according to claim 1, wherein the gasket is a heat-resistant steel material.

9. The charging device according to claim 8, wherein the gasket is disposed in a radial recess in a flange of the bearing housing.

10. The charging device according to claim 8, wherein the gasket includes a contact surface having a heat-resistant coating.

11. The charging device according to claim 1, wherein the gasket is a nickel-based alloy.

12. The charging device according to claim 11, wherein the gasket is disposed in a radial recess in a flange of the bearing housing.

13. The charging device according to claim 2, wherein the gasket is disposed in a radial recess in a flange of the bearing housing.

14. The charging device according to claim 2, wherein the gasket is formed by at least two disc springs.

15. The charging device according to claim 3 wherein the disc spring is disposed at a contact point with the turbine housing and the bearing housing comprises rounded contact surfaces.

16. The charging device according to claim 5, wherein the gasket includes a contact surface having a heat-resistant coating.

17. A charging device comprising:
   a turbine housing; and
   a bearing housing having a bearing arrangement for a shaft carrying a turbine wheel and a compressor wheel, a gasket arranged by metal-to-metal connection between a radially orientated flat surface of the turbine housing and a radially orientated flat surface of the bearing housing, wherein the gasket is resilient and includes a contact surface having a heat-resistant coating.

18. The charging device according to claim 17, wherein the gasket is a disc spring.

19. The charging device according to claim 18, wherein the disc spring is disposed at a contact point with the turbine housing and the bearing housing comprises rounded contact surfaces.

20. A charging device comprising:
   a turbine housing; and
   a bearing housing having a bearing arrangement for a shaft carrying a turbine wheel and a compressor wheel, a gasket arranged by metal-to-metal connection between a radially orientated flat surface of the turbine housing and a radially orientated flat surface of the bearing housing, wherein the gasket is resilient;
   wherein the gasket is disposed at a contact point with the turbine housing and the bearing housing comprises rounded contact surfaces.

* * * * *